(12) United States Patent
Jonas et al.

(10) Patent No.: US 7,962,757 B2
(45) Date of Patent: Jun. 14, 2011

(54) SECURE COORDINATE IDENTIFICATION METHOD, SYSTEM AND PROGRAM

(75) Inventors: Jeffrey J. Jonas, Las Vegas, NV (US); Steven Bruce Dunham, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 10/807,826

(22) Filed: Mar. 24, 2004

(65) Prior Publication Data

US 2005/0066182 A1    Mar. 24, 2005

Related U.S. Application Data

(60) Provisional application No. 60/457,119, filed on Mar. 24, 2003.

(51) Int. Cl.
*H04L 9/00* (2006.01)

(52) U.S. Cl. ............ 713/189; 713/182; 726/30; 726/29; 726/28; 380/46

(58) Field of Classification Search .................. 713/189; 380/46
See application file for complete search history.

(56) References Cited

U.S. PATENT DOCUMENTS

| | | | |
|---|---|---|---|
| 1,261,167 A | 4/1918 | Russell | |
| 3,659,085 A | 4/1972 | Porter | |
| 3,793,634 A * | 2/1974 | Heller et al. | 342/80 |
| 4,232,313 A * | 11/1980 | Fleishman | 342/36 |
| 4,981,370 A | 1/1991 | Dziewit et al. | |
| 5,010,478 A | 4/1991 | Deran | |
| 5,229,764 A | 7/1993 | Matchett et al. | |
| 5,403,639 A | 4/1995 | Belsan et al. | |
| 5,454,101 A | 9/1995 | Mackay et al. | |
| 5,534,855 A | 7/1996 | Shockley et al. | |
| 5,555,409 A | 9/1996 | Leenstra et al. | |
| 5,560,006 A | 9/1996 | Layden et al. | |
| 5,608,907 A | 3/1997 | Fehskens et al. | |
| 5,659,731 A | 8/1997 | Gustafson | |
| 5,675,785 A | 10/1997 | Hall et al. | |
| 5,758,343 A | 5/1998 | Vigil et al. | |

(Continued)

FOREIGN PATENT DOCUMENTS

JP    10154231    6/1998

(Continued)

OTHER PUBLICATIONS

Winkler et al., *The State of Record Linkage and Current Research Problems*.

(Continued)

*Primary Examiner* — Nasser Moazzami
*Assistant Examiner* — Fikremariam Yalew
(74) *Attorney, Agent, or Firm* — Gates & Cooper LLP

(57) ABSTRACT

A method, program and system (10) for processing data are disclosed. The method, program and system comprising the steps of: (a) receiving data representing a location of an item (e.g., people, personal property, real property, organizations, chemical compounds, organic compounds, proteins, biological structures, biometric values or atomic structures), (c) determining a plurality of fixed coordinates that represent the location (e.g., by "rounding" and/or comparing to a reference grid), (d) utilizing an algorithm (e.g., encryption, encoding and/or one-way function) to process the plurality of fixed coordinates (each separately or together), and (e) comparing the processed data to at least a portion of secondary data (perhaps comprising data previously stored in a database).

30 Claims, 3 Drawing Sheets

System 10

U.S. PATENT DOCUMENTS

| | | |
|---|---|---|
| 5,764,977 A | 6/1998 | Oulid-Aissa et al. |
| 5,778,375 A | 7/1998 | Hecht |
| 5,781,911 A | 7/1998 | Young et al. |
| 5,784,464 A | 7/1998 | Akiyama et al. |
| 5,794,246 A | 8/1998 | Sankaran et al. |
| 5,799,309 A | 8/1998 | Srinivasan |
| 5,819,263 A | 10/1998 | Bromley et al. |
| 5,848,373 A | 12/1998 | Delorme et al. |
| 5,878,416 A | 3/1999 | Harris et al. |
| 5,892,828 A | 4/1999 | Perlman |
| 5,933,831 A | 8/1999 | Jorgensen |
| 5,991,408 A | 11/1999 | Pearson et al. |
| 5,991,733 A | 11/1999 | Aleia et al. |
| 5,991,758 A | 11/1999 | Ellard |
| 5,991,765 A | 11/1999 | Vethe |
| 5,995,097 A | 11/1999 | Tokumine et al. |
| 5,995,973 A | 11/1999 | Daudenarde |
| 6,014,670 A | 1/2000 | Zamanian et al. |
| 6,032,158 A | 2/2000 | Mukhopadhyay et al. |
| 6,035,295 A | 3/2000 | Klein |
| 6,035,300 A | 3/2000 | Cason et al. |
| 6,035,306 A | 3/2000 | Lowenthal et al. |
| 6,041,410 A | 3/2000 | Hsu et al. |
| 6,044,378 A | 3/2000 | Gladney |
| 6,049,805 A | 4/2000 | Drucker et al. |
| 6,052,693 A | 4/2000 | Smith et al. |
| 6,058,477 A | 5/2000 | Kusakabe et al. |
| 6,065,001 A | 5/2000 | Ohkubo et al. |
| 6,073,140 A | 6/2000 | Morgan et al. |
| 6,076,167 A | 6/2000 | Borza |
| 6,092,199 A | 7/2000 | Dutcher et al. |
| 6,122,641 A | 9/2000 | Williamson et al. |
| 6,122,757 A | 9/2000 | Kelley |
| 6,160,903 A | 12/2000 | Hamid et al. |
| 6,167,517 A | 12/2000 | Gilchrist et al. |
| 6,185,557 B1 | 2/2001 | Liu |
| 6,202,151 B1 | 3/2001 | Musgrave et al. |
| 6,208,990 B1 | 3/2001 | Suresh et al. |
| 6,263,446 B1 | 7/2001 | Kausik et al. |
| 6,272,495 B1 | 8/2001 | Hetherington |
| 6,317,834 B1 | 11/2001 | Gennaro et al. |
| 6,334,132 B1 | 12/2001 | Weeks |
| 6,339,775 B1 | 1/2002 | Zamanian et al. |
| 6,357,004 B1 | 3/2002 | Davis |
| 6,385,604 B1 | 5/2002 | Bakalash et al. |
| 6,418,450 B2 | 7/2002 | Daudenarde |
| 6,446,210 B1 | 9/2002 | Borza |
| 6,460,037 B1 | 10/2002 | Weiss et al. |
| 6,523,041 B1 | 2/2003 | Morgan et al. |
| 6,674,860 B1 * | 1/2004 | Pirila .................. 380/247 |
| 6,684,334 B1 | 1/2004 | Abraham |
| 6,697,947 B1 | 2/2004 | Matyas, Jr. et al. |
| 6,734,783 B1 | 5/2004 | Anbai |
| 6,743,022 B1 | 6/2004 | Sarel |
| 6,819,797 B1 | 11/2004 | Smith |
| 6,886,747 B2 | 5/2005 | Snapp |
| 6,948,062 B1 * | 9/2005 | Clapper .................. 713/162 |
| 6,968,338 B1 | 11/2005 | Gawdiak et al. |
| 7,007,168 B2 * | 2/2006 | Kubo et al. .................. 713/183 |
| 7,143,289 B2 * | 11/2006 | Denning et al. .............. 713/168 |
| 7,177,426 B1 * | 2/2007 | Dube .............................. 380/46 |
| 7,249,257 B2 * | 7/2007 | Brundage et al. ............. 713/176 |
| 7,254,839 B2 * | 8/2007 | Fahraeus et al. ................ 726/34 |
| 7,512,234 B2 * | 3/2009 | McDonnell et al. .......... 380/247 |
| 2002/0023088 A1 | 2/2002 | Thwaites |
| 2002/0184509 A1 | 12/2002 | Scheidt et al. |
| 2003/0097380 A1 | 5/2003 | Mulhern et al. |
| 2003/0108202 A1 * | 6/2003 | Clapper .................. 380/258 |
| 2003/0154194 A1 | 8/2003 | Jonas |
| 2003/0182018 A1 | 9/2003 | Snapp |
| 2003/0182568 A1 | 9/2003 | Snapp et al. |
| 2003/0191739 A1 | 10/2003 | Chatterjee et al. |
| 2004/0007616 A1 | 1/2004 | Snapp |
| 2004/0049682 A1 | 3/2004 | Wilson et al. |
| 2004/0128274 A1 | 7/2004 | Snapp et al. |
| 2004/0162802 A1 | 8/2004 | Jonas |
| 2004/0210763 A1 | 10/2004 | Jonas |
| 2005/0060556 A1 | 3/2005 | Jonas |
| 2006/0010119 A1 | 1/2006 | Jonas |

FOREIGN PATENT DOCUMENTS

| | | |
|---|---|---|
| JP | 10327142 | 12/1998 |
| JP | 11224236 | 8/1999 |
| JP | 11265432 | 9/1999 |
| JP | 2002222170 | 8/2002 |
| JP | 2008305662 | 12/2008 |
| JP | 2009204401 | 9/2009 |
| WO | 98/52317 | 11/1998 |

OTHER PUBLICATIONS

Winkler et al., Advanced Methods for Record Linkage.

Jaro, "Record Linkage Research and the Calibration of Record Linkage Algorithms", U.S. Bureau of the Census, Report No. rr-84/27 (Aug. 9, 1984).

DeWitt et al., *An Evaluation of Non-Equijoin Algorithms*, Proc. 17th Intl. Conf. on Very Large Data Bases, Sep. 1991, pp. 443-452.

Li et al., *Skew Handling Techniques in Sort-Merge Join*.

Verykios et al., *A Bayesian decision model for cost optimal record matching*, The VLDB Journal, 2000, vol. 12, Nos. 28-450, pp. 28-40.

van den Bercken et al., *The Bulk Index Join: A Generic Approach to Processing Non-Equijoins*.

Monge, *Matching Algorithms within a Duplicate Detection System*.

Yuwono et al., *Search and Ranking Algorithms for Locating Resources on the World Wide Web*, Intl. Conf. on Data Engineering, 1996, pp. 164-171.

Hou et al., *Medical Image Retrieval by Spatial Features*, 1992 IEEE Intl. Conf. on Systems, Man and Cybernetics, Oct. 1992, vol. 1, pp. 1364-1369.

Callan et al., *Searching Distributed Collections With Inference Networks*, Proc. 18th Annual Intl. ACM SIGIR Conf. on R&D in Information Retrieval, Jul. 9-13, 1995, pp. 21-28.

DeFazio et al., *Integrating IR and RDBMS Using Cooperative Indexing*, Proc. 18th Annual Intl. ACM SIGIR Conf. on R&D in Information Retrieval, Jul. 9-13, 1995, pp. 84-92.

Sclaroff et al., *ImageRover: A Content-Based Image Browser for the World Wide Web*, IEEE Workshop on Content-Based Access of Image and Video Libraries, Jun. 1997, pp. 2-9.

Knoblock, *Searching the World Wide Web*, Trends & Controversies, Jan.-Feb. 1997, pp. 8-24.

Amba et al., *Automatic Linking of Thesauri*, Proc. 18th Annual Intl. ACM SIGIR Conf. on R&D in Information Retrieval, Jul. 9-13, 1995, pp. 181-188.

Gelbart et al., *Toward a Comprehensive Legal Information Retrieval System*, Database and Expert Systems Applns., Proc. Intl. Conf. in Vienna, Austria, 1990, pp. 121-125.

Kimoto et al., *Construction of a Dynamic Thesaurus and Its Use for Associated Information Retrieval*, Proc. 13th Intl. Conf. on R&D in Information Retrieval, Sep. 5-7, 1990, pp. 227-241.

Findler, *Information Retrieval Systems*, An Artificial Intelligence Technique for Information and Fact Retrieval, 1991.

Yearwood et al., *Retrieving cases for treatment advice in nursing using text representation and structured text retrieval*, Artificial Intelligence in Medicine, Jan. 1997, vol. 9, No. 1, pp. 79-98.

Batory et al., *Implementation Concepts for an Extensible Data Model and Data Language*, acm Transactions on Database Systems, Sep. 1988, vol. 13, No. 3, pp. 231-262.

Haisten, *Designing a Data Warehouse*, InfoDB, vol. 9, No. 2, pp. 2-9.

Labio et al., *The WHIPS Prototype for Data Warehouse Creation and Maintenance*, 1997, pp. 557-559.

Haisten, *Information Discovery in the Data Warehouse*, InfoDB, vol. 9, No. 6, pp. 14-25.

Suardi et al., *Execution of Extended Multidatabase SQL*, 1993, pp. 641-650.

Romberg, *Meta-Entities Keeping Pace with Change*, Database Programming & Design; Jan. 1995, pp. 54-59.

Fellegi, *Tutorial on the Fellegi-Sunter Model for Record Linkage*, Section II: Overview of Applications and Introduction to Theory, pp. 127-178.

Crane et al., "Project LINK-LINK: An Interactive Database of Administrative Record Linkage Studies", National Center for Education Statistics and U.S. Department of Agriculture, Record Linkage Techniques—1985: Proceedings of the Workshop on Exact Matching Methodologies, Arlington, VA, pp. 311-315 (May 9-10, 1985).

Childers et al., *The IRS/Census Direct Match Study—Final Report*, Bureau of the Census—Statistical Research Division Report Series, Aug. 1, 1984, pp. 1-22.

LaPlant Jr., *Generalized Data Standardization Program Generator (GENSTAN) Program Generation System Part II*, Bureau of the Census Statistical Research Division Report Series, Jul. 22, 1986.

LaPlant Jr., *User's Guide for the Generalized Record Linkage Program Generator (GENLINK) SRD Program Generator System User's Guide: Part III*, Bureau of the Census Statistical Research Division Report Series, Sep. 1, 1986.

Winkler et al., *An Application of the Fellegi-Sunter Model of Record Linkage to the 1990 U.S. Decennial Census*.

Winkler, *Matching and Record Linkage*.

Scheuren et al., *Recursive Merging and Analysis of Administrative Lists and Data*.

Winkler, *Record Linkage Software and Methods for Merging Administrative Lists*.

Wang et al., *Automatically Detecting Deceptive Criminal Identities*.

Hernandez, *A Generalization of Band Joins and the Merge/Purge Problem*, IEEE Trans. on Knowledge and Data Engineering, 1996.

Lu et al., *Pipelined Band Join in Shared-Nothing Systems*, Proc. 1995 Asian Computing Science Conf., Dec. 1995, pp. 239-253.

Beebe, "Why are Epidemiologists Interested in Matching Algorithms?", National Cancer Institute, Record Linkage Techniques—1985: Proceedings of the Workshop on Exact Matching Methodologies, Arlington, VA, pp. 139-143 (May 9-10, 1985).

Boruch et al., "Exact Matching of Micro Data Sets in Social Research: Benefits and Problems", Record Linkage Techniques—1985: Proceedings of the Workshop on Exact Matching Methodologies, Arlington, VA, pp. 145-153 (May 9-10, 1985).

Scheuren, "Methodologic Issues in Linkage of Multiple Data Bases", National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 155-178 (May 9-10, 1985).

Winkler, "Processing of Lists and String Comparison", Energy Information Administration, Record Linkage Techniques—1985: Proceedings of the Workshop on Exact Matching Methodologies, Arlington, VA, pp. 181-187 (May 9-10, 1985).

Jaro, "Current Record Linkage Research", U.S. Bureau of the Census, Record Linkage Techniques—1985: Proceedings of the Workshop on Exact Matching Methodologies, Arlington, VA, pp. 317-320 (May 9-10, 1985).

Smith, "Record-Keeping and Data Preparation Practices to Facilitate Record Linkage", Statistics Canada, Record Linkage Techniques—1985: Proceedings of the Workshop on Exact Matching Methodologies, Arlington, VA, pp. 321-326 (May 9-10, 1985).

Hill et al., "Generalized Iterative Record Linkage System", Statistics Canada, Record Linkage Techniques—1985: Proceedings of the Workshop on Exact Matching Methodologies, Arlington, VA, pp. 327-333 (May 9-10, 1985).

Howe et al., "A Generalized Iterative Record Linkage Computer System for Use in Medical Follow-up Studies", Computers and Biomedical Research 14, pp. 327, 240 (1981).

Lee, Joon Ho, "Combining Multiple Evidence from Different Properties of Weighting Schemes", Proceedings of the $18^{th}$ Annual International ACM SIGIR Conference on Research and Development in Information Retrieval, Seattle, Washington, USA (Jul. 9-Jul. 13, 1995) pp. 180-188.

International Search Report from PCT/US03/35607, dated Apr. 24, 2004.

International Search Report for International Application No. PCT/US04/09035 dated Nov. 4, 2004.

Written Opinion for International Application No. PCT/US04/09035 dated Nov. 4, 2004.

Japanese Office Action dated Mar. 30, 2010.

Written Opinion for International Application No. PCT/US02/41630 dated Jan. 19, 2005.

International Search Report from PCT/US03/35607 dated Apr. 23, 2004.

International Search Report for PCT/US04/03465 dated Apr. 7, 2005.

International Search Report for PCT/US03/41662 dated May 28, 2004.

Hanming Tu, Pattern Recognition and Geographical Data Standarization, The Proceedings of Geoinformatics '99 Conference, Jun. 19-21, 1999, pp. 1-7.

Matchware Technologies Inc., AUTOSTAN, Generalized Standardization System, User's Manual Version 4.6, Feb. 11, 1998, pp. 1-90.

Vality Technology Incorporated, INTEGRITY, Data Re-engineering Environment, SUPERSTAN User Guide Version 2.5, Mar. 1998.

\* cited by examiner

Figure 2 – System 10

SECURE COORDINATE IDENTIFICATION METHOD, SYSTEM AND PROGRAM

CROSS-REFERENCE TO RELATED APPLICATIONS

The present application claims the benefit of provisional application No. 60/457,119, filed in the United States Patent Office on Mar. 24, 2003.

FEDERALLY SPONSORED RESEARCH OR DEVELOPMENT

Not Applicable.

TECHNICAL FIELD

This invention generally relates to processing data and, more particularly, to the identification, processing, and comparison of location coordinates in a confidential and anonymous manner.

BACKGROUND

Identifying and sharing a location of an item (e.g., individual, personal property, or real property) in a confidential manner is an important goal in various situations. For example, United States army personnel may have identified the location of a first target and may wish to determine whether a second target identified by a foreign army's personnel is the same in a greater effort of coordinating strike options, while at the same time not disclosing: (a) to the foreign army's personnel the location of the first target if the second target is not the same, (b) to the United States army personnel the location of the second target if the second target is not the same as the first target and/or (c) to any third person either the United States army personnel's knowledge of the first target or the foreign army's personnel's knowledge of the second target.

However, there are no existing systems that use a cryptographic algorithm to identify, disclose and compare location coordinates representing the locations of particular items in a secure and confidential manner.

The present invention is provided to address these and other issues.

DETAILED DESCRIPTION

Figure 1:
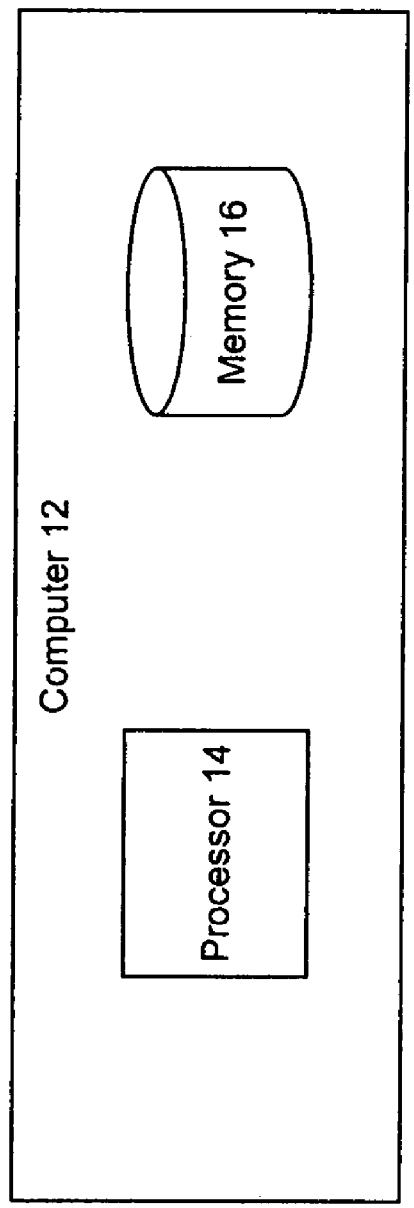
FIG. 1 is a functional block diagram of the system in accordance with the invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

A data processing system 10 for processing data is illustrated in FIG. 1. The system 10 includes at least one conventional computer 12 having a processor 14 and memory 16. The memory 16 is used both for storage of the executable software to operate the system 10 as well as for storage of the data in a database and random access memory. All or part of the software may be embodied within various applications and equipment, depending upon the relevant confidentiality and security requirements. For example, the software may be embodied, stored or provided on any computer readable medium utilizing any of the following, at a minimum: (a) an installed software application on the source system, (b) a box unit that self-destroys the unit upon any tampering, and/or (c) a CD, DVD, floppy disc or other removable media. The system 10 may effect all or part of the processing of the item location data on one or more computers 12 at the source location and/or may effect all or part of the processing with one or more computers 12 at a location different from the source (e.g., a central processing system).

To keep the item location more secure, the item location data can be encrypted. However, due to the nature of the mathematics, when values are processed, for example, by encryption or hashing, and are compared to another location data, there will only be a match when the two item location data being compared match identically. That is, data of two item locations that vary by only one unit of measurement will not be identifiable as having a potential relationship.

To overcome this potential misidentification, a system can determine a fixed coordinate grid point corresponding to the item location, with the fixed coordinate grid point then processed for use in the comparison process. This ensures that the encrypted values are matchable to previously stored data (i.e. previously stored fixed coordinate grid points). However, this raises the possibility that two item locations that are close enough to warrant a match may be assigned to two different fixed coordinate grid points and would fail to match after being processed.

Assigning the item location to more than one fixed coordinate grid point addresses the issue of incorrectly failed matching. By determining more than one of the nearest fixed coordinates to a given item location and using each in a comparison process, failed matches can be reduced. When each of the fixed coordinate grid points is processed, a set of results is available for comparison. If any element of the set matches with known data, the item location may be worthy of further investigation.

Figure 2:
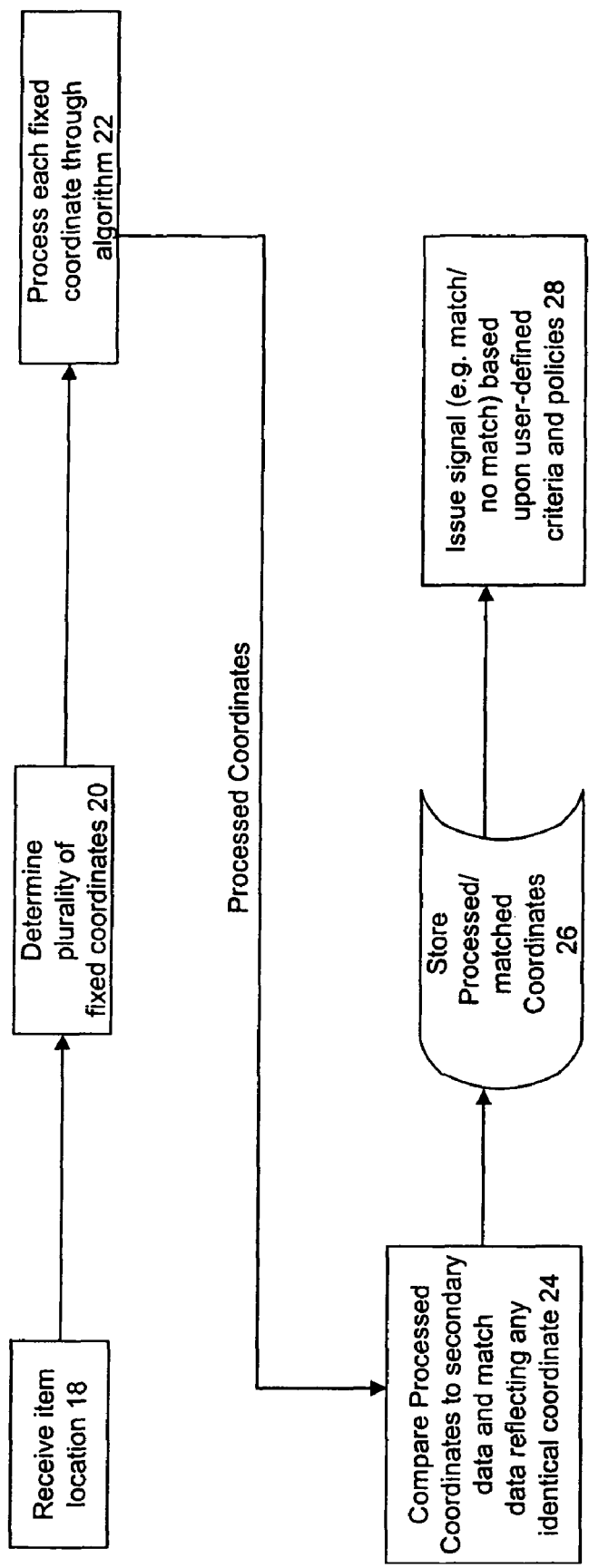
FIG. 2 is a functional block diagram of the System block of FIG. 1.

As illustrated in FIG. 2, in a step 18 the system 10 receives data representing the location of a particular item (e.g., natural person, organization, chemical compound, organic compound, protein, biological structure, biometric value, atomic structure, inventory item, real property, personal property). In a step 20 the system then determines a plurality of fixed coordinates that represent the location by several processes, for example, rounding or comparison to a predetermined grid. Rounding calculates values on a virtual grid based upon the location. Comparing the location to the pre-determined grid finds the nearest and/or surrounding fixed coordinates. The pre-determined grid may be uniform (e.g., equal spacing between grid points), non-uniform (e.g., equal spacing in a first portion of grid points, but differential spacing in a second portion of grid points), multiple, tiered and/or three-dimensional, four dimensional or more multi-dimensional. For example, where the data representing the location consists of latitude (x), longitude (y), height (z) and time (t) variables, the system in a multiple grid circumstance compares the data to a four-dimensional non-uniform grid representing latitude, longitude, height and time dimensions to establish a plurality of fixed coordinates which would also allow for comparisons of moving targets.

While the embodiment can use just two fixed coordinates, using only two fixed coordinates creates a greater possibility that two item locations, which may be infinitesimally close to each other, may be determined to be near separate pairs of fixed coordinates. For example, the two fixed coordinates corresponding with one of the two item locations are determined to be different, and perhaps significantly farther from the two fixed coordinates corresponding with the other of the two item locations. As such, the grid would preferably have at least three (3) fixed coordinates (creating a triangle-type shape if lines were to connect the fixed coordinates on the grid), with scaled positioning of other coordinates through the grid based upon a user-defined criterion, such as spacing of a particular distance or time (e.g., one (1) minute) and potentially subdividing the coordinates according to quantity (e.g., population density). In addition, the coordinates may cover a several areas or layers, for example, the system can determine the nearest three fixed coordinates and an additional three fixed coordinates surrounding those, creating a broader matching region.

Several grids and grid combinations may be used in determining fixed coordinates. For example, an item location on a rectangular grid could be assigned to the three nearest grid coordinates. Similarly, an item location could be assigned to all the coordinates of the grid encompassing the item location. Both of these examples involve simple geometric and trigonometric calculations. When the grid system is more complex, as discussed above, these simple techniques may not be sufficient.

Figure 3:
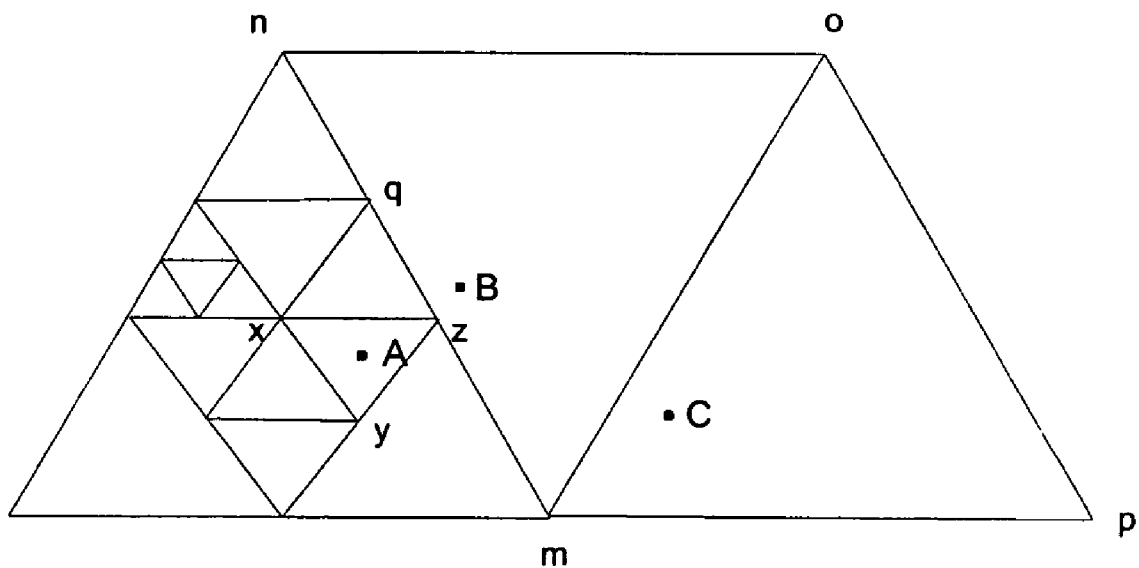
FIG. 3 is a representation of a non-uniform grid system.

Referring briefly to FIG. 3, an illustration of a non-uniform grid system 30 is shown. The non-uniform grid system 30 has a plurality of triangular grids that may relate to population density, terrain features or other criteria. Coordinates x, y, z, m, n, o, p, q, represent a plurality of fixed coordinates. Item location A is within a bounding triangle defined by the fixed coordinates x, y and z. The closest fixed grid points are, in this case, x, y and z, which would be used for comparison with previously stored data. It can be seen that point B, while within a bounding triangle m, n, o, may actually be closer to fixed coordinates outside that bounding triangle, such as points x, z and q. If so, point B, when using nearest fixed coordinates, would be associated with the fixed coordinate grid points x, z and q when being compared to previously stored data. Point C appears closest to point m of its bounding triangle m, o, p. The system, if using nearest fixed coordinates, can use mathematical evaluation to determine the other two fixed coordinates closest to C.

The use of more complex mathematics can help ensure that the most relevant fixed coordinates represent an item location, particularly in the case of non-uniform or high-dimension grid systems. One useful technique is the affine transform, which allows transformation to a coordinate system that preserves linearity and spacing. A high level overview of the use of an affine transform in this respect is illustrated below.

By way of a detailed example of one embodiment of how the system determines 20 three (3) fixed coordinates that represent the location, given a uniform triangular grid with spacing of one (1) minute, the system processes data by: (a) taking a given $(x, y)$ where x is longitude and y is latitude in degrees corresponding to the location, (b) multiplying the given $(x, y)$ by sixty (60) to scale to minutes, (c) taking an affine transformation $(x', y')=(x-\frac{1}{2}y, y)$, which transforms the uniform triangular grid into a uniform rectangular grid (i.e., creating a rectangle-type shape if lines were to connect four (4) fixed coordinates on the uniform rectangular grid) and enabling the point $(x', y')$ to fall within the uniform rectangular grid that corresponds to two (2) three fixed coordinate areas in the uniform triangular grid, (d) set $(x_0, y_0)=(\lfloor x' \rfloor, \lfloor y' \rfloor)$ to establish the lower left corner on the uniform rectangular grid, (e) set $P_1=(x_0+1, y_0)$ and $P_2=(x_0, y_0+1)$ to determine two (2) fixed coordinates on the uniform rectangular grid, (f) calculate $(x'-x_0)+(y'-y_0)$ to determine a third fixed coordinate on the uniform rectangular grid, which, depending upon whether the third fixed coordinate is in the top right or lower left area of the uniform rectangular grid, is $P_0=(x_0+1, y_0+1)$ if the result of the calculation is greater than 1 or $P_0=(x_0, y_0)$ if the result of the calculation is less than 1, (g) transform the resulting three (3) fixed coordinates back to the uniform triangular grid by applying the affine transformation $(x', y')=(x+\frac{1}{2}y, y)$ to each of $P_0$, $P_1$ and $P_2$ (which may be implemented using integers), resulting in an integral number of half minutes, which may be converted to a number from 0 to 43199 to take into account the international date line, and $P_0$, $P_1$ and $P_2$ being the three (3) nearest fixed coordinates on the uniform triangular grid representing the location.

The system then: (a) processes each of the plurality of fixed coordinates through a cryptographic algorithm (e.g., encryption, encoding, one-way function such as MD-5) to render the plurality of fixed coordinates confidential ("Processed Coordinates") in step 22 and (b) compares the Processed Coordinates to secondary data (e.g., previously saved data) and matches any data reflecting one or more identical fixed coordinate in step 24. For example, where the plurality of fixed coordinates associated with a first location is determined to be 1, 2, 3 and the plurality of fixed coordinates associated with a second location is determined to be 2, 3, 5, the system 10 processes each of the plurality of fixed coordinates through the cryptographic algorithm, such as MD-5, and combines salt to the plurality of fixed coordinates in step 22, causing each resulting Processed Coordinate to be confidential. Then, the comparison between the resulting Processed Coordinates would identify the match of the respective Processed Coordinate associated with the 2 and 3 of the plurality of fixed coordinates common between the first location and the second location.

Thereafter, the Processed Coordinates and any matches are stored in a database in step 26 and the system issues a signal (e.g., match or no match) based upon user-defined rules and policies in step 28, such as transferring the Processed Coordinates to other systems for analysis and coordination.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computer-implemented method for identification, processing, and comparison of location coordinate data in a confidential and anonymous manner, comprising:

receiving, in a computer, a plurality of fixed coordinates, each of the fixed coordinates representing a location of an item comprising an individual, personal property or real property, and the plurality of fixed coordinates being generated by more than one process;

utilizing, in the computer, a cryptographic algorithm to encrypt the plurality of fixed coordinates, thereby forming a processed data; and comparing, in the computer, the encrypted fixed coordinates of the processed data to at least a portion of secondary data that comprises one or more encrypted fixed coordinates to determine whether a relationship exists between the encrypted fixed coordinates of the processed data and the encrypted fixed coordinates of the secondary data.

2. The method of claim 1 further comprising the step of receiving data representing the location of the item and determining the plurality of fixed coordinates that represent the location of the item prior to receiving the plurality of fixed coordinates.

3. The method of claim 1 further comprising the step of storing the processed data in a database.

4. The method of claim 1 wherein the step of comparing the processed data to at least a portion of secondary data includes the secondary data comprising data previously stored in a database.

5. The method of claim 1 further comprising the step of matching the processed data to the at least a portion of secondary data that is determined to reflect an identical one of the plurality of fixed coordinates.

6. The method of claim 1 further comprising the step of issuing a signal based upon a user-defined rule.

7. The method of claim 1 wherein the step of determining the plurality of fixed coordinates that represent the location occurs in relation to a grid.

8. The method of claim 7 wherein the grid comprises a uniform grid.

9. The method of claim 7 wherein the grid comprises a non-uniform grid.

10. The method of claim 7 wherein the grid is a multi-dimensional grid.

11. The method of claim 7 wherein the grid is based upon a user-defined criterion.

12. The method of claim 11 wherein the user-defined criterion corresponds with quantity.

13. The method of claim 11 wherein the user-defined criterion corresponds to time.

14. The method of claim 1 wherein the step of determining the plurality of fixed coordinates that represent the location includes the step of determining a nearest of the plurality of fixed coordinates.

15. The method of claim 1 wherein the step of determining a plurality of fixed coordinates that represent the location includes the step of determining the plurality of fixed coordinates surrounding the location.

16. A non-transitory computer readable medium containing program instructions for execution by a computer for performing a method of identification, processing, and comparison of location coordinate data in a confidential and anonymous manner, comprising:

receiving, in a computer, a plurality of fixed coordinates, each of the fixed coordinates representing a location of an item comprising an individual, personal property or real property, and the plurality of fixed coordinates being generated by more than one process;

utilizing, in the computer, a cryptographic algorithm to encrypt the plurality of fixed coordinates, thereby forming a processed data; and comparing, in the computer, the encrypted fixed coordinates of the processed data to at least a portion of secondary data that comprises one or more encrypted fixed coordinates to determine whether a relationship exists between the encrypted fixed coordinates of the processed data and the encrypted fixed coordinates of the secondary data.

17. The computer readable medium for performing the method of claim 16 further comprising the step of receiving data representing the location of the item and determining the plurality of fixed coordinates that represent the location of the item prior to receiving the plurality of fixed coordinates.

18. The computer readable medium for performing the method of claim 16 further comprising the step of storing the processed data in a database.

19. The computer readable medium for performing the method of claim 16 wherein the step of comparing the processed data to at least a portion of secondary data includes the secondary data comprising data previously stored in a database.

20. The computer readable medium for performing the method of claim 16 further comprising the step of matching the processed data to the at least a portion of secondary data that is determined to reflect an identical one of the plurality of fixed coordinates.

21. The computer readable medium for performing the method of claim 16 further comprising the step of issuing a signal based upon a user-defined rule.

22. The computer readable medium for performing the method of claim 16 wherein the step of determining the plurality of fixed coordinates that represent the location occurs in relation to a grid.

23. The computer readable medium for performing the method of claim 22 wherein the grid comprises a uniform grid.

24. The computer readable medium for performing the method of claim 22 wherein the grid comprises a non-uniform grid.

25. The computer readable medium for performing the method of claim 22 wherein the grid is a multi-dimensional grid.

26. The computer readable medium for performing the method of claim 22 wherein the grid is based upon a user-defined criterion.

27. The computer readable medium for performing the method of claim 26 wherein the user-defined criterion corresponds with quantity.

28. The computer readable medium for performing the method of claim 26 wherein the user-defined criterion corresponds to time.

29. The computer readable medium for performing the method of claim 16 wherein the step of determining the plurality of fixed coordinates that represent the location includes the step of determining the nearest of the plurality of fixed coordinates.

30. The computer readable medium for performing the method of claim 16 wherein the step of determining a plurality of fixed coordinates that represent the location includes the step of determining the plurality of fixed coordinates surrounding the location.

* * * * *